United States Patent
Niehues et al.

(10) Patent No.: US 7,682,425 B2
(45) Date of Patent: Mar. 23, 2010

(54) METHOD FOR REMOVING AMMONIA AND DUST FROM A WASTE GAS THAT RESULTS DURING THE PRODUCTION OF FERTILIZERS

(75) Inventors: Paul Niehues, Dortmund (DE); Harald Franzrahe, Dortmund (DE)

(73) Assignee: Uhde GmbH, Dortmund (DE)

( * ) Notice: Subject to any disclaimer, the term of this patent is extended or adjusted under 35 U.S.C. 154(b) by 975 days.

(21) Appl. No.: 10/574,091

(22) PCT Filed: Sep. 4, 2004

(86) PCT No.: PCT/EP2004/009886

§ 371 (c)(1),
(2), (4) Date: May 22, 2006

(87) PCT Pub. No.: WO2005/032696

PCT Pub. Date: Apr. 14, 2005

(65) Prior Publication Data

US 2007/0039469 A1 Feb. 22, 2007

(30) Foreign Application Priority Data

Oct. 2, 2003 (DE) ................................ 103 46 519

(51) Int. Cl.
*B01D 53/14* (2006.01)
(52) U.S. Cl. .............................. 95/199; 95/214; 95/216; 95/228; 95/232; 96/242; 96/355; 423/237; 423/238
(58) Field of Classification Search ................... 95/214, 95/216, 199, 232, 228; 96/355–358, 361–364, 96/242; 423/237, 238
See application file for complete search history.

(56) References Cited

U.S. PATENT DOCUMENTS 3,344,585 A * 10/1967 Hollowell ..................... 95/199

(Continued)

FOREIGN PATENT DOCUMENTS

DE 33 06 664 A 8/1984

(Continued)

OTHER PUBLICATIONS

International Search Report (English language).

*Primary Examiner*—Duane Smith
*Assistant Examiner*—Ives Wu
(74) *Attorney, Agent, or Firm*—Collard & Roe, P.C.

(57) ABSTRACT

The invention relates to a method for removing ammonia and dust from a waste gas that occurs during the production of fertilizers, preferably urea, in which method the waste gas is introduced into a first washer, and a cooling gas is introduced into the one washer and an aqueous solution is introduced into the other washer, whereby both the waste gas and the cooling gas pass through at least one mist collector before exiting from the washer, in each instance, is supposed to be developed further in such a manner that the waste gas pollution can be clearly reduced. This is accomplished in that the additional water is first introduced into a fine-washing area of the first washer, delimited by the mist collector on the top and by a liquid-impermeable partition bottom at the bottom, and sprayed onto the at least one mist collector, and the aqueous solution that forms in the fine-washing area is subsequently passed into the second washer.

5 Claims, 2 Drawing Sheets

U.S. PATENT DOCUMENTS

Figure 1:
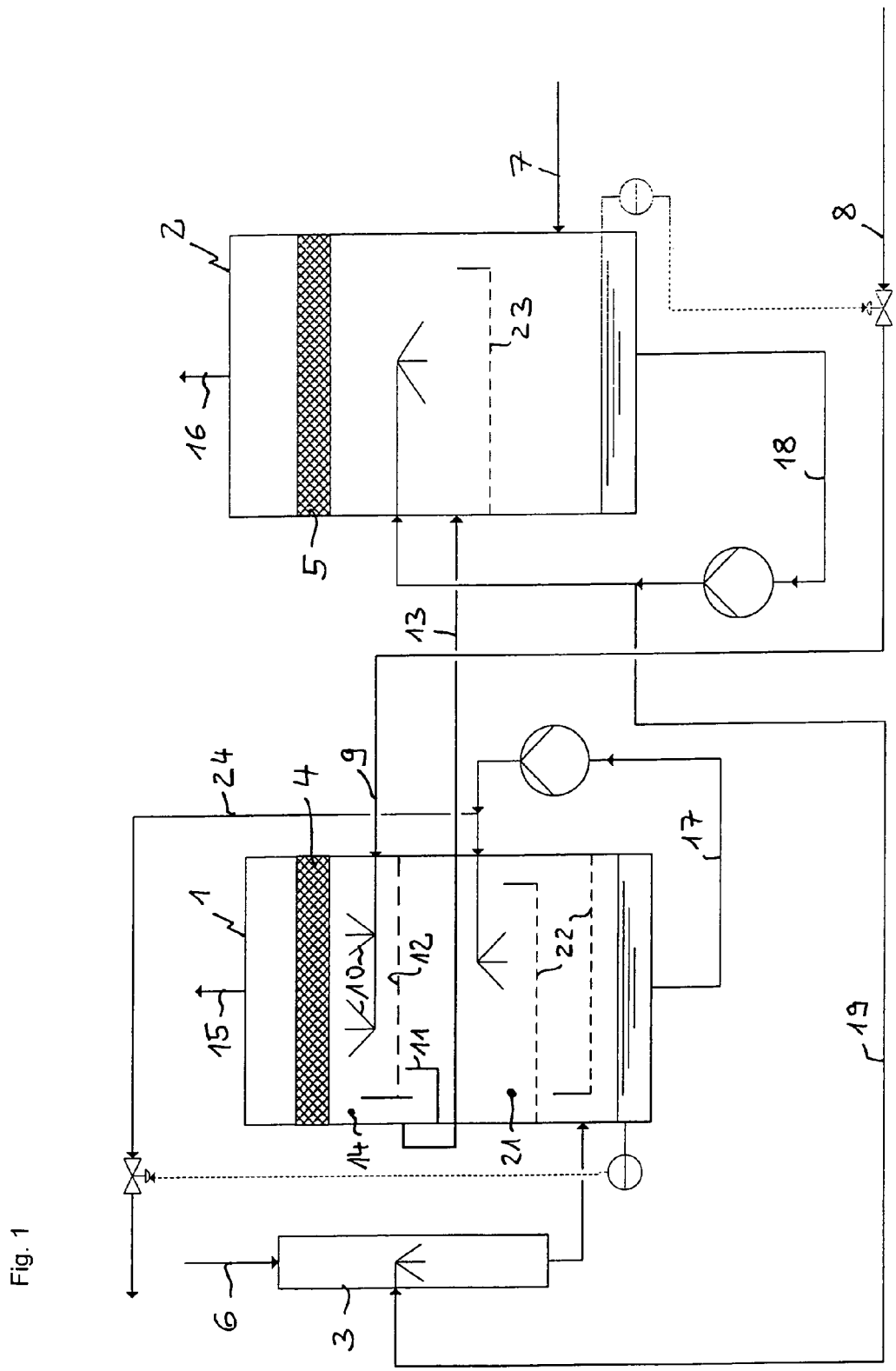

| | | | |
|---|---|---|---|
| 3,607,022 A * | 9/1971 | Hausweiler et al. | 423/550 |
| 3,985,523 A * | 10/1976 | Kaupas et al. | 95/193 |
| 4,140,501 A * | 2/1979 | Ekman | 96/232 |
| 4,157,250 A * | 6/1979 | Regehr et al. | 96/299 |
| 4,559,210 A * | 12/1985 | Diemer et al. | 423/237 |
| 4,652,678 A * | 3/1987 | Douwes | 564/73 |
| 5,478,507 A * | 12/1995 | Bros | 261/114.1 |
| 7,258,848 B1 * | 8/2007 | Blackwell et al. | 423/237 |

FOREIGN PATENT DOCUMENTS

| | | |
|---|---|---|
| EP | 0 440 932 A | 8/1991 |
| EP | 0514902 A1 * | 5/1992 |
| EP | 0 514 902 A | 11/1992 |
| EP | 0514902 A1 * | 11/1992 |
| EP | 1 151 785 A | 11/2001 |
| GB | 2 315 435 A | 2/1998 |

* cited by examiner

METHOD FOR REMOVING AMMONIA AND DUST FROM A WASTE GAS THAT RESULTS DURING THE PRODUCTION OF FERTILIZERS

CROSS REFERENCE TO RELATED APPLICATIONS

Applicants claim priority under 35 U.S.C. §119 of German Application No. 103 46 519.7 filed Oct. 2, 2003. Applicants also claim priority under 35 U.S.C. §365 of PCT/EP2004/009886 filed Sep. 4, 2004. The international application under PCT article 21(2) was not published in English.

The invention relates to a method for removing ammonia and dust from a waste gas that occurs during the production of fertilizers, preferably urea, in which method the waste gas is introduced into a first washer, and a cooling gas is introduced into a second washer, and additional water is introduced into the one washer and an aqueous solution is introduced into the other washer, whereby both the waste gas and the cooling gas pass through at least one mist collector before exiting from the washer, in each instance.

In the production of fertilizers that contain ammonia, i.e. fertilizers that can split off ammonia, e.g. fertilizers that contain urea, ammonia and waste air streams that contain dust occur in various process steps, which must be purified before being passed into the environment or recycled back into the process. Such waste gases occur, in particular, during granulation and cooling.

To remove dust from the waste gas that exits from granulation, and from the granulate cooling gas, a method of this type, belonging to the applicant, is known. Two washers are provided to carry out this method, each of which is equipped with at least one mist collector (demister) in the upper region, in each instance. In this connection, the waste gas that comes from granulation is introduced into the first washer, while the cooling gas is introduced into the second washer. For purification, additional water, preferably purified or non-purified process water, is introduced into the second washer, below the mist collector, in counter-current to the cooling gas. The aqueous solution that exits from the second washer is subsequently introduced into the first washer, also in counter-current to the waste gas to be purified.

In practice, it has turned out that this known method requires some improvement. Since the aqueous solution that exits from the first washer must be further processed, i.e. further used, there is an effort to set the urea concentration in the aqueous solution as high as possible, in order to keep the energy expenditure for concentrating the exiting aqueous solution as low as possible. In the case of the previous method, however, limits are set for this maximal concentration. The previous maximal value of the urea concentration in the aqueous solution in the first washer lies at approximately 30 to 45%; higher concentrations are not possible, since despite the mist collector, it is not entirely possible to prevent droplets accordingly charged with urea from remaining in the exiting waste gas, and causing a correspondingly high urea concentration in the latter.

It is therefore the task of the invention to further develop a method of this type, in such a manner that the waste gas pollution can be clearly reduced.

This task is accomplished, according to the invention, in the case of a method of the type indicated initially, in that the additional water is first introduced into a fine-washing area of the first washer, delimited by the mist collector on the top and by a liquid-impermeable partition bottom at the bottom, and sprayed onto the at least one mist collector, and the aqueous solution that forms in the fine-washing area is subsequently passed into the second washer.

Different from the known method, the additional water is therefore first introduced completely into the additional fine-washing area provided in the first washer, in which area the droplet-charged waste gas enters before passing through the mist collector. In this connection, great dilution occurs in the fine-washing region, as a result of the additional water, so that the urea concentration of the droplets is significantly reduced. At the same time, purification of the mist collector occurs, in addition.

Because of the great dilution of the droplets, it is possible to clearly increase the urea concentration of the aqueous solution in the actual main washing area of the washer, so that the energy expenditure for subsequent concentration of the aqueous solution can be greatly decreased. Furthermore, with this way of managing the process, the result can be achieved that the dust pollution in the waste gas can be reduced from previously achievable values of about 50 mg/m$^3$ to 20 mg/m$^3$.

The aqueous solution that exits from the second washer is passed into the first washer in known manner, of course into the main washing area of the first washer, provided below the partition bottom, into which the waste gas also enters.

To separate the fine-washing area and the main washing area of the first washer, a bell-shaped bottom is preferably used. Fundamentally, other types of partition bottoms can also be used, which are liquid-impermeable but gas-permeable.

In order to reduce the ammonia concentration in the waste gas, it is provided, in another advantageous embodiment, that an acid is introduced into the fine-washing region of the first washer. For example, sulfuric acid or nitric acid can be used. Such an acid treatment is fundamentally known, for example from EP 0 440 932 B1.

In order to optimize the further processing of the aqueous solution that exits from the first washer, in terms of energy, it is preferably provided that a urea concentration of 40-60%, preferably 55% is set in the main washing area of the first washer. The energy expenditure for concentration can be clearly reduced thereby, without this very high urea concentration in the aqueous solution resulting in problems for purification of the waste gas, since, as mentioned above, great dilution of the droplets that enter into the fine-washing area occurs in this area.

The invention will be explained in greater detail below, using the drawing. This shows, in:

FIG. 1 a fundamental schematic for implementing the method, and in

Figure 2:
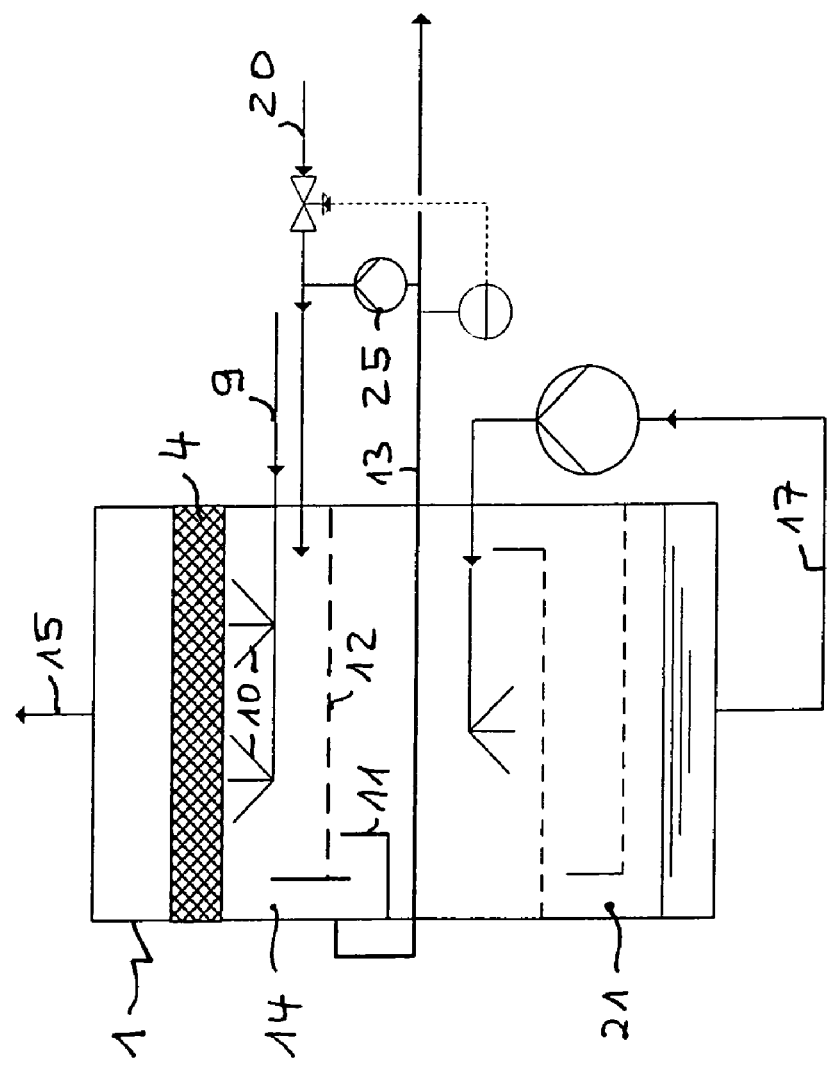

FIG. 2 a detail of FIG. 1 in a special embodiment.

A system for implementing the method first has a first washer 1 and a second washer 2. A pre-purification stage 3 precedes the first washer 1. A mist collector 4 (demister) is disposed in the upper area of the first washer 1, just like a mist collector 5 in the second washer 2. The first washer 1 is divided into two washing areas, whereby a liquid-impermeable but gas-permeable partition bottom 12 (e.g. bell-shaped bottom) as well as an outlet 11 are disposed below the mist collector 4, forming a fine-washing area 14. Below the partition bottom 12, there is the main washing area 21 of the first washer 1.

The system parts described above are preferably components of a system for the production of fertilizers, preferably urea, and are connected with a granulator, not shown, and a cooler. Waste gas charged with ammonia and dust is passed out of the granulator, not shown, specifically at first into the pre-purification stage 3, as indicated by an arrow 6. The waste gas passes through the pre-purification stage 3 and is introduced into the main washing area 21 of the first washer 1. Cooling gas, which is also charged, is passed directly to the second washer 2, as indicated by an arrow 7.

Additional water, preferably purified or non-purified process water, is supplied directly to the fine-washing area 14 of the first washer 1, whereby the water feed line is indicated with arrows 8, 9. The water feed line ends within the washer 1, below the mist collector 4, in spray heads 10 that are directed upward, in such a manner that additional water is sprayed against the mist collector 4 and thereby cleans it off. The additional water mixes with the droplets that pass through the partition bottom 12, and results in a great dilution in the urea concentration of the droplets, so that the droplets have a remaining urea concentration of only 1 to 4%, for example, even if the urea concentration in the main washing area 21 is 55 to 60%. The additional water thereby accumulates urea, and exits from the discharge 11, to which a line 13 that opens into the second washer 2 is connected, as an aqueous solution, whereby the aqueous solution is passed into the second washer 2.

The waste gas to be purified thereby first enters the main washing area 21 of the first washer 1, in which screen bottoms 22 or the like are disposed, after having passed through the pre-purification stage 3, and then gets into the fine-washing area 14, passing through the partition bottom 12, in which area great dilution and reduction of the droplets adhering to the waste gas takes place, by means of the mixing process with the additional water. Subsequently, the waste gas passes through the mist collector 4 and then exits at the head of the first washer, in purified form (arrow 15).

The cooling gas to be purified enters the second washer 2 in the lower area (arrow 7), in which washer screen bottoms 23 are also disposed, in order to pass in counter-current through the aqueous solution that is introduced, and then through the mist collector 5, and subsequently exit at the head of the second washer (arrow 16).

The sump product in the two washers 1 and 2, in each instance, is circulated in usual manner, as indicated by corresponding circulation systems 17 and 18, respectively. In this connection, the aqueous solution is branched out of the circulation system 18, and passed to the pre-purification stage 3 by way of a line 19. Thus, aqueous solution and waste gas enter from the pre-purification stage 3 into the main washing area 21 of the first washer 1.

Because of the significant dilution and purification effect in the fine-washing area 14, it is possible to set a urea concentration in the aqueous solution of about 60% in the main washing area 21 of the first washer 1, i.e. the aqueous solution that exits from the washer 1 (line 24) then has a urea concentration of 60%, so that this aqueous solution can be concentrated with significantly less energy expenditure as compared with the state of the art, for the purpose of further use. Despite this high urea concentration in the main washing area 21, it is possible to achieve urea concentrations even on the order of 1 to 4% in the fine-washing area 14, because of the way the process is conducted, with the introduction of the additional water into the fine-washing area 14. The urea concentration in the second washer 2 lies at about 10%.

As FIG. 2 shows, it is preferably provided, in addition, that an acid is introduced into the fine-washing area 14, in order to reduce the ammonia pollution of the waste gas, as indicated by an arrow 20. For this purpose, a part of the aqueous solution that exits from the outlet 11 of the first washer 1, out of the line 13, is recirculated by way of a pump 25, to introduce the acid into the fine-washing area 14. Sulfuric acid or nitric acid, for example, can be used as an acid. Such an acid treatment is fundamentally known from EP 0 440 932 B1. The addition of acid (stream 20) preferably takes place in a corrosion-resistant, self-priming nozzle after the pump (e.g. jet nozzle), the inflow of which is regulated. In this connection, the pressure line of the pump can be used in whole or in part as a driving jet stream.

The method is fundamentally suitable also alternatively for a washer in which several mist collectors are disposed in a standing arrangement. The additional water is then passed, accordingly, first into a fine-washing area of the washer, for the waste gas that comes from granulation.

The invention claimed is:

1. A method for removing ammonia and dust from a waste gas that occurs during the production of fertilizers, in which method the waste gas is introduced into a first washer, and a cooling gas is introduced into a second washer, and additional water is introduced into the first washer and an aqueous solution is introduced into the second washer, wherein both the waste gas and the cooling gas pass through at least one mist collector before exiting from the respective first and second washer, in each instance, wherein the additional water is first introduced into a fine-washing area of the first washer, delimited by the mist collector on the top and by a liquid-impermeable partition bottom at the bottom, and sprayed onto the at least one mist collector, and the aqueous solution that forms in the fine-washing area is subsequently passed into the second washer.

2. The method according to claim 1, wherein the aqueous solution that exits from the second washer is introduced into the main washing area of the first washer, provided below the partition bottom, into which the waste gas also enters.

3. The method according to claim 1, wherein a bell-shaped bottom is used as the partition bottom.

4. The method according to claim 1, wherein an acid is introduced into the fine-washing area of the first washer.

5. The method according to claim 1, wherein a urea concentration of 40-60% is set in the main washing area of the first washer.

\* \* \* \* \*